United States Patent
Nusier et al.

(10) Patent No.: US 9,821,678 B2
(45) Date of Patent: Nov. 21, 2017

(54) BATTERY ENCLOSURE HAVING T-SHAPED GUIDES ON THE OUTER SURFACE FOR STIFFENERS AND IMPACT ABSORBING ELEMENTS

(71) Applicant: FORD GLOBAL TECHNOLOGIES, LLC, Dearborn, MI (US)

(72) Inventors: Saied Nusier, Canton, MI (US); Mohamed Ridha Baccouche, Ann Arbor, MI (US); Saeed David Barbat, Novi, MI (US); William L. Stanko, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/490,042

(22) Filed: Apr. 18, 2017

(65) Prior Publication Data

US 2017/0217330 A1    Aug. 3, 2017

Related U.S. Application Data

(62) Division of application No. 14/619,205, filed on Feb. 11, 2015, now Pat. No. 9,656,571.

(51) Int. Cl.
*H01M 2/10*        (2006.01)
*B60L 11/18*       (2006.01)
*B60K 1/04*        (2006.01)

(52) U.S. Cl.
CPC ....... *B60L 11/1879* (2013.01); *H01M 2/1083* (2013.01); *B60K 1/04* (2013.01); *B60K 2001/0438* (2013.01); *B60Y 2306/01* (2013.01); *H01M 2220/20* (2013.01)

(58) Field of Classification Search
CPC .......... B60L 11/1879; H01M 10/0525; H01M 2/1083; H01M 2220/20; B60K 1/04
See application file for complete search history.

(56) References Cited

U.S. PATENT DOCUMENTS

| | | | |
|---|---|---|---|
| 2,671,599 | A | 3/1954 | Price |
| 5,156,225 | A | 10/1992 | Murrin |
| 6,279,300 | B1 | 8/2001 | Simhaee |
| 6,300,005 | B1 | 10/2001 | Kump |

(Continued)

FOREIGN PATENT DOCUMENTS

| | | |
|---|---|---|
| CN | 102593399 | 7/2012 |
| CN | 103000835 | 3/2013 |

(Continued)

OTHER PUBLICATIONS

Dr. Lothar Wech, et al., Crash Safety Aspects of HV Batteries for Vehicles, Paper No. 11-0302, 2011.

*Primary Examiner* — Stewart Fraser
(74) *Attorney, Agent, or Firm* — Jason Rogers; Brooks Kushman P.C.

(57) ABSTRACT

A battery housing for a traction motor battery of a vehicle is disclosed that includes attachments retained by parallel T-shaped guides on the outer surface of the walls of the enclosure. The attachments are oriented to extend either in a horizontal orientation or vertical orientation. The depth of the attachments and shape of the attachments may be selected to meet impact force requirements and packaging space limitations imposed by the structure of the vehicle.

5 Claims, 3 Drawing Sheets

(56) References Cited

U.S. PATENT DOCUMENTS

| | | |
|---|---|---|
| 7,572,550 B2 | 8/2009 | Saito et al. |
| 8,573,647 B2 | 11/2013 | Enning |
| 8,632,902 B2 | 1/2014 | Wendorf et al. |
| 8,702,161 B2 | 4/2014 | Charbonneau et al. |
| 2003/0124315 A1 | 7/2003 | Grochoski |
| 2007/0026305 A1 | 2/2007 | Jeon et al. |
| 2008/0124625 A1 | 5/2008 | Hock et al. |
| 2009/0136843 A1 | 5/2009 | Yamamoto et al. |
| 2012/0121946 A1 | 5/2012 | Eckstein et al. |
| 2012/0183828 A1 | 7/2012 | van den Akker |
| 2013/0236753 A1 | 9/2013 | Yue et al. |
| 2014/0045024 A1 | 2/2014 | Waters |
| 2014/0287297 A1 | 9/2014 | Reitzle et al. |
| 2016/0233460 A1 | 8/2016 | Nusier et al. |
| 2016/0233467 A1* | 8/2016 | Nusier ............... H01M 2/1083 |

FOREIGN PATENT DOCUMENTS

| | | |
|---|---|---|
| CN | 203434226 | 2/2014 |
| CN | 103730616 | 4/2014 |
| DE | 102008059941 | 6/2010 |
| DE | 102009053138 | 5/2011 |
| DE | 102010024320 | 12/2011 |
| DE | 102010043899 | 5/2012 |
| DE | 102010050826 | 5/2012 |
| DE | 102011120960 | 4/2013 |
| DE | 102011118284 | 5/2013 |
| DE | 102011120010 | 6/2013 |
| DE | 102012012294 | 12/2013 |
| DE | 102012015919 | 2/2014 |
| ES | 2396407 | 2/2013 |
| GB | 2186253 | 8/1987 |
| JP | 2010126804 | 6/2010 |
| JP | 2013045715 | 3/2013 |
| JP | 02013045715 | 3/2013 |
| KR | 100210949 | 7/1999 |
| TW | 201421776 | 6/2014 |
| WO | 2012025166 | 3/2012 |
| WO | 2012073439 | 6/2012 |
| WO | 2013079080 | 6/2013 |
| WO | 2013156732 | 10/2013 |
| WO | 2013180611 | 12/2013 |
| WO | 2014034020 | 3/2014 |

* cited by examiner

BATTERY ENCLOSURE HAVING T-SHAPED GUIDES ON THE OUTER SURFACE FOR STIFFENERS AND IMPACT ABSORBING ELEMENTS

REFERENCE TO RELATED APPLICATIONS

This application is a division of U.S. application Ser. No. 14/619,205 filed Feb. 11, 2015, the disclosure of which is hereby incorporated in its entirety by reference herein.

TECHNICAL FIELD

This disclosure relates to protective structures for battery enclosures for electric vehicle batteries.

BACKGROUND

Electric vehicles use batteries that are enclosed in an enclosure or housing that is assembled to the vehicle body. The battery may be assembled to the vehicle body at a location that is spaced from the front, rear and sides of the vehicle. For example, the battery may be assembled below the passenger compartment, in the trunk, in front of the passenger compartment or in a longitudinally extending tunnel.

The battery must be protected from damage in a collision. The battery housing may be tightly packed with lithium ion battery packs or other types of battery cells. Deformation of the battery housing is to be avoided to prevent intrusion of the housing into the area housing the battery cells. Intrusions into the battery housing may rupture of battery cells and spill the contents of the battery cells.

When the battery housing is assembled in a central location in the vehicle, e.g. beneath the passenger compartment, limited crush space is available between the side of the vehicle body and the battery enclosure. More crush space is available between the battery enclosure and the front or rear ends of the vehicle. In either situation, there is a long felt and unfulfilled need for an efficient and effective lightweight structure for absorbing energy from a collision that minimizes battery enclosure deformation. The structure must have limited package space requirements while providing added stiffness to the battery enclosure assembly including the impact absorbing structure.

Some approaches to protecting the battery enclosure have proposed adding beams and cross members on the battery enclosure or extending outboard of the battery enclosure. These approaches add weight to the vehicle and require additional space to package the beams and cross members. Added weight is to be avoided because added weight adversely affects fuel economy. Increasing packaging space requirements adversely affects vehicle design freedom.

The above problems and other problems are addressed by this disclosure as summarized below.

SUMMARY

According to one aspect of this disclosure, a housing is disclosed for a traction motor battery of a vehicle. The housing includes a plurality of side walls, a top wall and a bottom wall. Each of the walls includes a plurality of parallel T-shaped guides. The T-shaped guides on the top wall and on the bottom wall extend horizontally and the T-shaped guides on some of the side walls extend vertically. The housing also includes a plurality of elongated attachments assembled between the T-shaped guides.

According to other aspects of this disclosure, the T-shaped guides may include a pair of cantilevered flanges and a spacing leg that extends from each of the walls to a juncture of the pair of cantilevered flanges. The attachments may include edge portions that have a thickness that is substantially equal to the length of the spacing leg.

The attachments may include a first edge portion and a second edge portions that are adapted to be received by a pair of parallel T-shaped guides. The attachments may also include a central portion between the first edge portion and the second edge portion that is co-planar with the edge portions. The attachments may include a central portion between the first edge portion and the second edge portion that includes a partially cylindrical wall that protrudes outwardly from the T-shaped guides and connects the first edge portion and the second edge portion. Alternatively, the attachments may include a central portion between the first edge portion and the second edge portion that includes an impact receiving outer face and supporting walls that extend between the central portion and the edge portions.

The attachments may include a first embodiment including a first central portion between the first edge portion and the second edge portion that includes a first impact receiving outer face and a first pair of supporting walls that extend a depth "D" between the first central portion and the first and second edge portions, and a second embodiment including a second central portion between a third edge portion and a fourth edge portion including a second central portion between the third edge portion and the fourth edge portion that includes a second impact receiving outer face and supporting walls that extend a depth "D" between a second central portion and the third and fourth edge portions, wherein the depth "D" is greater than the depth "d."

According to another aspect of this disclosure, the plurality of attachments may include different first and second sets of attachments. The first set of attachments may have a depth "D" measured from the respective wall to an impact receiving surface of the attachment in a direction normal to the wall. The second set of attachments may have a depth "d" measured from the respective wall to an impact receiving surface of the attachment in a direction normal to the wall, wherein the depth "D" is greater than the depth "d." The attachments may also include a third set of attachments having a depth "d1" measured from the respective wall to an impact receiving surface of the attachment in a direction normal to the wall, wherein the depth "d" is greater than the depth "d1."

The attachments may include different types of attachments. A first type of attachment may be provided that has a first central portion between a first edge portion and a second edge portion, wherein the first central portion is partially cylindrical. A second type of attachment may have a second central portion between a third edge portion and a fourth edge portion, wherein the second central portion includes a planar impact receiving outer face. The second type of attachment may include first and second supporting walls that extend between the second central portion and the third and fourth edge portions. Alternatively, the planar impact receiving outer face may be provided on an outer side of a planar reinforcement plate.

According to another aspect of this disclosure, method is disclosed for providing an impact absorbing enclosure for a battery of a vehicle having a battery powered traction motor. The method comprises providing vertically extending walls that have a plurality of parallel vertical guides providing a plurality of attachments and inserting the attachments between the vertical guides to provide the vertically extending walls with an impact absorbing assembly formed by of the attachments on an outer surface of the vertically extending walls.

According to other aspects of this disclosure as it relates to the method, the method may further comprise providing horizontally extending walls that having a plurality of parallel horizontally extending guides. Providing a plurality of second attachments and inserting the second attachments between the horizontally extending guides to provide the horizontally extending walls with impact absorbing assembly formed by the second attachments on a second outer surface of the horizontally extending walls.

According to other alternative aspects of this disclosure the vertically extending guides on the vertical walls may be T-shaped guides and the horizontally extending guides on the horizontal walls may be T-shaped guides. The T-shaped guides may include a spacing leg and a pair of cantilevered flanges, wherein the spacing leg extends from each of the walls to a juncture of the pair of cantilevered flanges. The attachments may include edge portions that have a thickness that is substantially equal to the length of the spacing leg.

According to other aspects of this disclosure, a peripheral space may be defined by the vehicle around the impact absorbing enclosure that is available for inserting the attachments includes small areas and large areas. The method may further include: a first additional step of selecting a first set of attachments having a depth "D" measured from the respective wall to an impact receiving surface of the attachment in a direction normal to the wall, and inserting the first set of attachments in the large areas; and a second additional step of selecting a second set of attachments having a depth "d" measured from the respective wall to an impact receiving surface of the attachment in a direction normal to the wall, and inserting the second set of attachments in the small areas, wherein the depth "D" is greater than the depth "d."

The method may also relate to a peripheral space defined by the vehicle around the impact absorbing enclosure that is available for inserting the attachments includes a first area having a first configuration and a second area having a second configuration. The method may include the use of a first type of attachment having a partially cylindrical first central portion between a first edge portion and a second edge portion. The method may further include the use of a second type of attachment having a planar second central portion between a third edge portion and a fourth edge portion, wherein the first area is provided with the first type of attachment and the second area is provided with a second type of attachment.

The above aspects of this disclosure and other aspects are described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
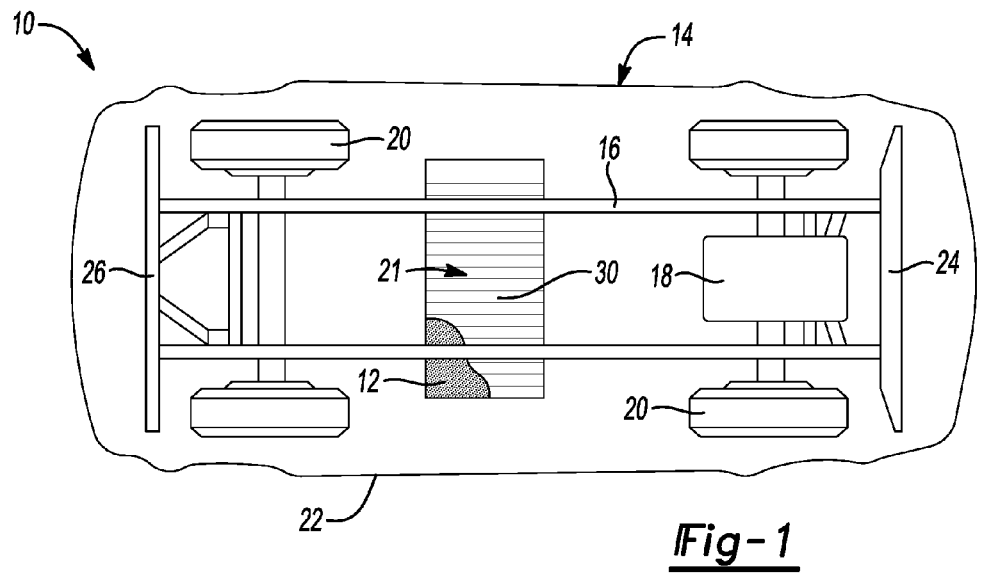
FIG. 1 is a diagrammatic bottom plan view of a vehicle illustrating a battery enclosure disposed on the vehicle frame beneath the passenger compartment.

Referring to FIG. 1, a vehicle 10 is diagrammatically illustrated with a battery 12 for a battery-powered traction motor. The vehicle 10 includes a body 14 that is supported on a frame 16. A traction motor 18 is also assembled to the frame 16. The traction motor 18 is a battery-powered traction motor that is powered by the battery 12 to drive the wheels 20. This disclosure focuses on the enclosure 21 for the battery.

The body 14 includes a side body 22, a front bumper 24 and a rear bumper 26. The battery 12 in the enclosure 21 is shown to be centrally located underneath the passenger compartment of the vehicle 10. It should be noted that there is a substantially greater amount of space between the battery and the front and rear bumper 24 and 26 compared to the relatively closer spacing of the side body 22 to the battery 12. Side impact collisions that result in driving the side body 22 toward the battery 12 present a greater challenge when designing attachments for the battery 12 due to the reduced amount of crush space available between the side body 22 and the battery 12.

Figure 3:
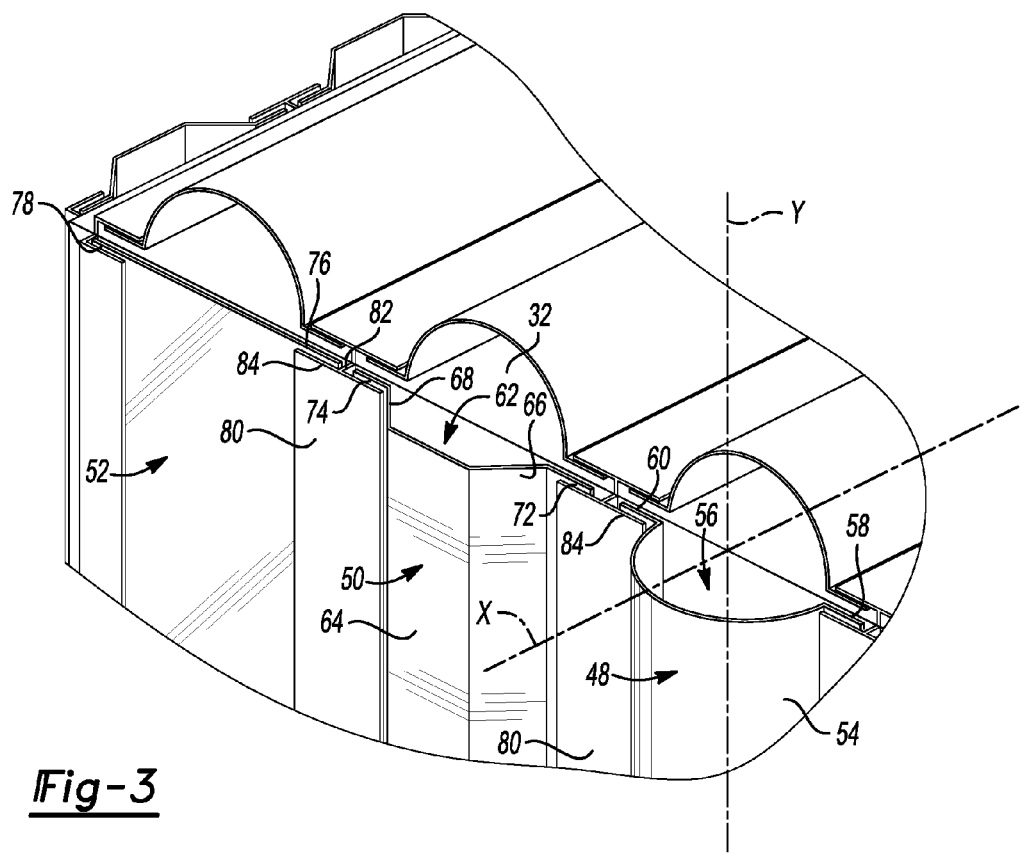
FIG. 3 is a fragmentary enlarged perspective view of a portion of the battery enclosure illustrated in FIG. 2.
Figure 2:
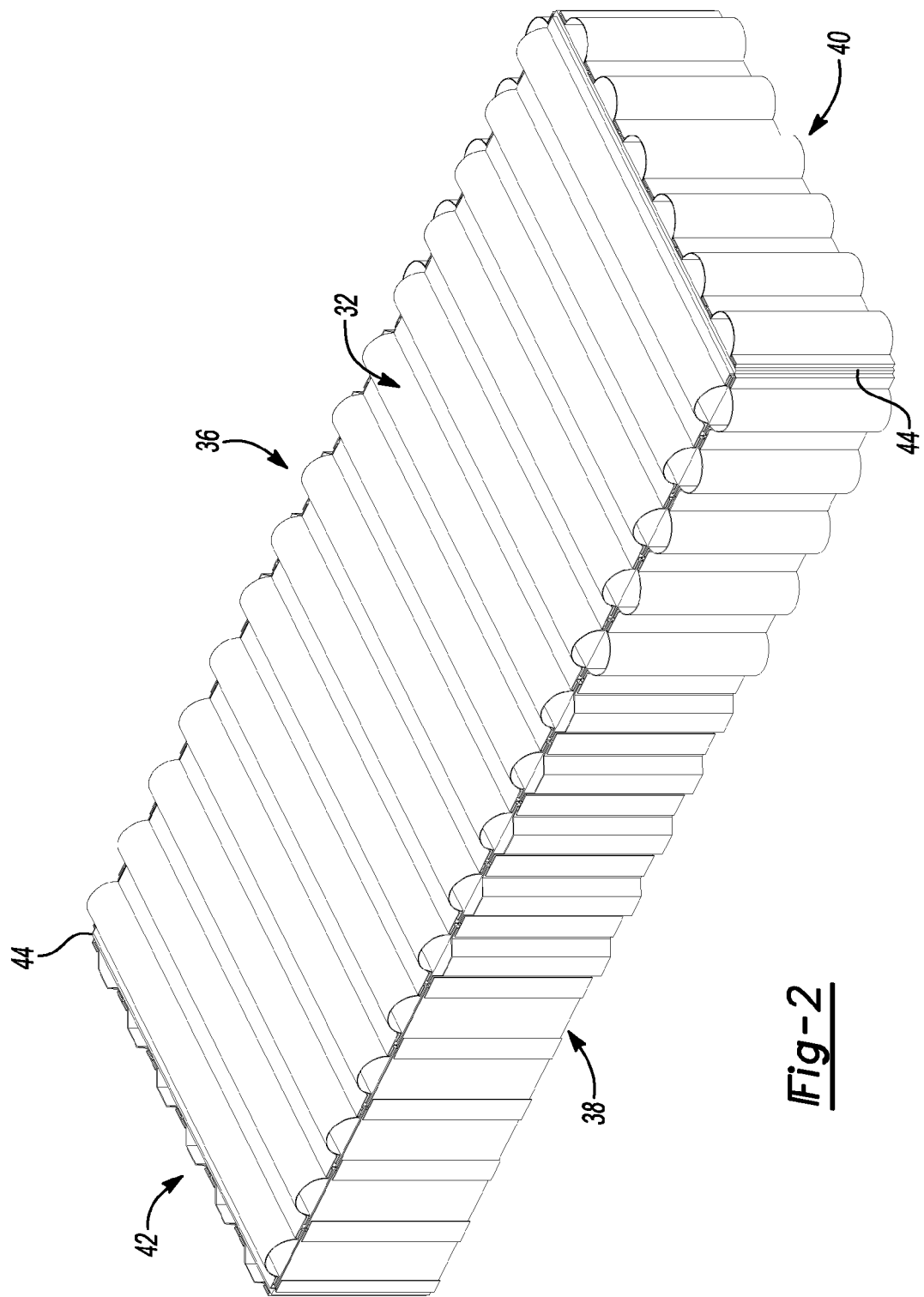
FIG. 2 is a perspective view of a first embodiment of a battery enclosure including several different types of attachments provided on the sides and top of the enclosure.
Figure 4:
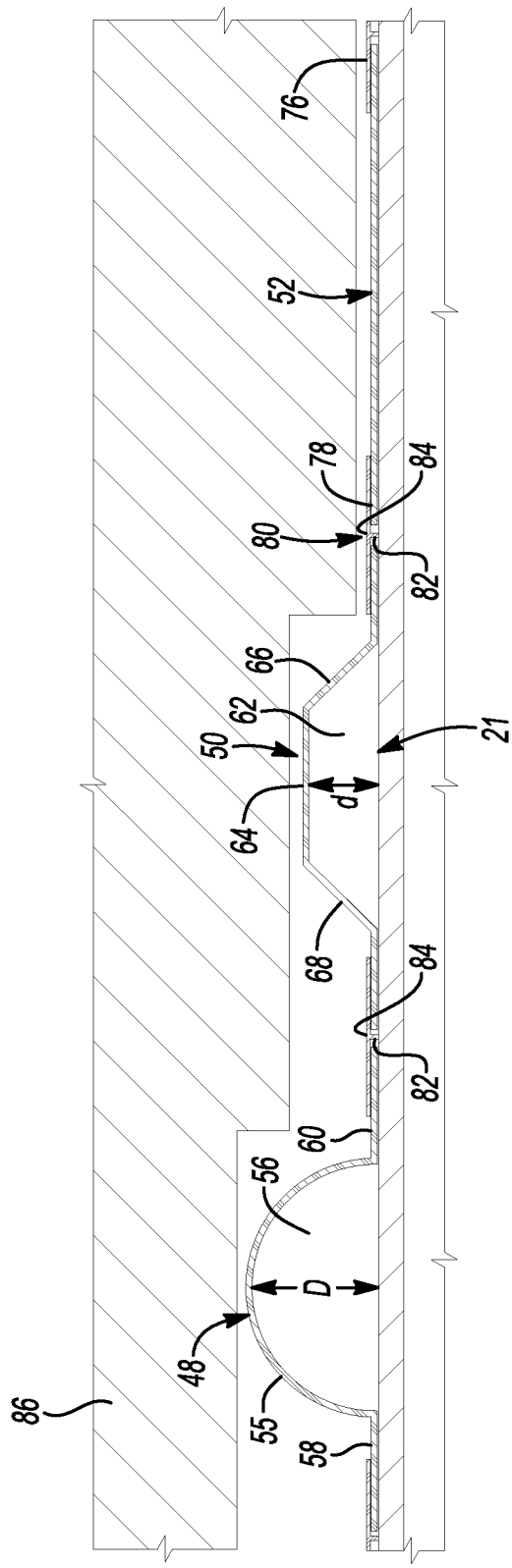
FIG. 4 is a fragmentary enlarged cross-sectional view of a portion of the battery enclosure illustrated in FIG. 2.

Referring to FIGS. 2-4, the enclosure, generally indicated by reference numeral 21, is shown to include a bottom wall 30 (shown in FIG. 1) and a top wall 32. A front wall 36 faces the front bumper 24 (shown in FIG. 1) and a rear wall 38 faces the rear bumper 26 (shown in FIG. 1). The battery enclosure 21 includes a right side wall 40 and a left side wall 42. The side walls are joined at corners 44.

In the illustrated embodiments three different types of attachments are shown but it should be understood that other configurations and shapes of attachments may be utilized depending in part on the space available within the vehicle. The three types of attachments illustrated include a partially cylindrical attachment 48, a trapezoidal space defining attachment 50 and a planar attachment 52.

The impact absorbing wall 54 of the semi-cylindrical attachment 48 as illustrated in FIGS. 2 and 3 is an arcuate, or semi-cylindrical, wall 54 that forms a semi-cylindrical pocket 56 with the planar wall of the enclosure 21. The impact absorbing wall 48 is an arcuate shaped elongated member with the arc of the wall being generated about a horizontal axis X when the partially cylindrical attachment 48 is mounted in a horizontal orientation when the partially cylindrical attachment 48 is attached to a top wall 32 or a bottom wall 30 or a vertical axis Y when attached to a vertical wall 36-42. The attachments may also be secured in a horizontal orientation on one or more of the vertical walls. Attachment flanges 58 and 60 are provided on opposite edges of the semi-cylindrical impact absorbing wall.

The trapezoidal space defining attachment 50 defines a trapezoidal pocket 62. The attachment 50 includes a spaced wall, or impact absorbing wall 64, a right ramp wall 66 and a left ramp wall 68 on opposite sides of the impact absorbing wall 64. The right ramp wall 66 and the left ramp wall 68 extend to right and left attachment flanges 72 and 74, respectively. As shown the ramp walls 66 and 68 are disposed at about a 45° angle relative to the wall of the enclosure. It should be understood that the orientation of the ramp surfaces could be at any angle or even at a right angle to the wall of the enclosure.

The planar attachment 52 is a planar member that is attached to one of the walls on the enclosure 21. The planar attachment 52 has a right edge 76 and a left edge 78 that function as attachment flanges.

The attachments 48-52 are attached to the walls of the enclosure by T-shaped guides 80 that are provided on the enclosure in a parallel orientation. The attachment flanges 58 and 60 of the semi-cylindrical attachment, right and left flanges 72 and 74 of the trapezoidal attachment 50 and edges 76 and 78 are adapted to be received by adjacent T-shaped guides 80 that hold the attachments against the enclosure 21. The T-shaped guides include a central flange 82 that is attached to a wall on an inner end and extends outwardly to a crossbar 84. The cross-bar 84 is parallel to the wall of the enclosure to which the T-shaped guide 80 is attached. Generally, one T-shaped guide supports two attachments except at a corner where only one attachment flange requires support.

Referring to FIG. 4, the different styles of attachments each have a different depth as measured from the walls and require more or less space. For example, in FIG. 4 the semi-cylindrical attachment 48 is shown to have a depth "D" and the trapezoidal attachment 50 has a depth "d." Depth "d" is less than depth "D" and would require less packaging space around the enclosure. The depth of the planar attachment is equal to the thickness of the planar attachment 52 and would be less than the depth "d" and would require even less space.

The ability of the respective attachments to absorb impact energy also varies depending upon the type of attachment. The attachments may be fabricated to have different thicknesses and may be made of different materials including aluminum alloys, steel alloys, fiber reinforced composites or polymers compositions. This disclosure enables the battery enclosure 21 to resist a wide range of impact forces while being accommodated within the packaging space available around the enclosure 21. Other vehicle components are generally indicated by structure 86 shown in FIG. 4. The other structure may be frame rails, beams, floor structure, accessories, or the like.

The T-shaped guides 80 provide a flexible mechanism for supporting the attachments on the enclosure 21. Changes in the design of a vehicle may impact the space available for the impact absorbing attachments. If there is a reduction in the space available as a result of a design change, a trapezoidal attachment may be substituted for a semi-cylindrical attachment. If a test indicates that additional impact energy absorption is needed on a side or part of one of the sides, stronger or thick attachments may be used or a different style of attachment may be specified.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A method of providing an impact absorbing enclosure for a battery of a vehicle having a battery powered traction motor comprising:
   providing vertically extending walls that have a plurality of parallel vertically extending guides;
   providing a plurality of attachments; and
   inserting the attachments between the vertically extending guides to provide the vertically extending walls with an impact absorbing assembly formed by the attachments on an outer surface of the vertically extending walls, providing horizontally extending walls having a plurality of parallel horizontally extending guides providing a plurality of second attachments; and inserting the second attachments between the horizontally extending guides to provide the horizontally extending walls with an impact absorbing assembly formed by the second attachments on a second outer surface of the horizontally extending walls, wherein the vertically extending guides on the vertically extending walls are T-shaped guides and the horizontally extending guides on the horizontally extending walls are T-shaped guides.

2. The method of claim 1 wherein the T-shaped guides include a spacing leg and a pair of cantilevered flanges, wherein the spacing leg extends from each of the walls to a juncture of the pair of cantilevered flanges.

3. The method of claim 2 wherein the attachments include edge portions that have a thickness that is substantially equal to a length of the spacing leg.

4. The method of claim 1 wherein a peripheral space defined by the vehicle around the impact absorbing enclosure that is available for inserting the attachments includes small areas and large areas, and wherein the method further includes:
   selecting a first set of attachments having a depth "D" measured from the respective wall to an impact receiving surface of the attachment in a direction normal to the wall, and inserting the first set of attachments in the large areas; and
   selecting a second set of attachments having a depth "d" measured from the respective wall to an impact receiving surface of the attachment in a direction normal to the wall, and inserting the second set of attachments in the small areas, wherein the depth "D" is greater than the depth "d".

5. The method of claim 1 wherein a peripheral space defined by the vehicle around the impact absorbing enclosure that is available for inserting the attachments includes a first area having a first configuration and a second area having a second configuration, and wherein the method further includes:
   selecting a first type of attachment having a first central portion between a first edge portion and a second edge portion, wherein the first central portion is partially cylindrical; and
   selecting a second type of attachment having a second central portion between a third edge portion and a fourth edge portion, wherein the second central portion includes a planar impact receiving outer face, wherein the first area is provided with the first type of attachment and the second area is provided with a second type of attachment.

* * * * *